United States Patent
Ishikawa

(10) Patent No.: US 9,737,994 B2
(45) Date of Patent: Aug. 22, 2017

(54) ROBOT HAND FOR HOLDING OBJECT, ROBOT, ROBOT SYSTEM, AND METHOD OF HOLDING OBJECT

(71) Applicant: FANUC CORPORATION, Yamanashi (JP)

(72) Inventor: Takashi Ishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/640,267

(22) Filed: Mar. 6, 2015

(65) Prior Publication Data

US 2015/0251321 A1    Sep. 10, 2015

(30) Foreign Application Priority Data

Mar. 7, 2014   (JP) ................................. 2014-045567

(51) Int. Cl.
*B66C 1/42*     (2006.01)
*B25J 15/06*    (2006.01)
(Continued)

(52) U.S. Cl.
CPC ......... *B25J 15/0616* (2013.01); *B25J 9/1612* (2013.01); *B25J 15/0047* (2013.01);
(Continued)

(58) Field of Classification Search
CPC .... B25J 15/0047; B25J 15/0038; B25J 15/08; B25J 15/026; B25J 13/082; B25J 15/0009; B25J 15/00; B25J 15/0226; B25J 9/023; B25J 9/104; B25J 15/04; B25J 9/1612; B25J 15/0616; B25J 15/0253; B25J 15/103; B25J 15/06; Y10S 901/36; Y10S 901/34;
(Continued)

(56) References Cited

U.S. PATENT DOCUMENTS 4,351,553 A * 9/1982 Rovetta ................ B25J 15/0009
                                                  294/106
4,699,414 A * 10/1987 Jones .................... B25J 15/026
                                                  294/119.1
(Continued)

FOREIGN PATENT DOCUMENTS

JP            61201750 U     12/1986
JP            4266331 A       9/1992
(Continued)

OTHER PUBLICATIONS

English abstract and machine translation for Japanese Publication No. JP 2000-317874, published Nov. 21, 2000, 7 pgs.
(Continued)

*Primary Examiner* — Stephen Vu
(74) *Attorney, Agent, or Firm* — Fredrikson & Byron, P.A.

(57) ABSTRACT

Provided is a robot hand applicable to purpose for holding various types of objects different in size or shape. The robot hand includes a hand base, a first hand arm having a first butting part and a first adsorption part, a second hand arm having a second butting part and a second adsorption part, and a driving mechanism for moving the first and second butting parts in directions to approach each other or separate from each other by moving the first and second hand arms relatively to each other.

6 Claims, 13 Drawing Sheets

(51) Int. Cl.
*B25J 9/16* (2006.01)
*B25J 15/08* (2006.01)
*B25J 15/00* (2006.01)
*B25J 15/02* (2006.01)
*B25J 15/10* (2006.01)

(52) U.S. Cl.
CPC ........... *B25J 15/0253* (2013.01); *B25J 15/06* (2013.01); *B25J 15/08* (2013.01); *B25J 15/103* (2013.01)

(58) Field of Classification Search
CPC .... Y10S 901/32; H01L 21/68707; A61F 2/05; G01N 35/00029; G01N 21/07; G01N 35/026; E02F 3/404
USPC ...................................................... 294/119.1
See application file for complete search history.

(56) References Cited

U.S. PATENT DOCUMENTS

| | | | | |
|---|---|---|---|---|
| 4,730,862 A | * | 3/1988 | Caen | B25J 13/082 294/207 |
| 5,150,937 A | * | 9/1992 | Yakou | B25J 9/1612 294/119.1 |
| 5,947,539 A | * | 9/1999 | Long | B25J 15/0028 294/119.1 |
| 2012/0286534 A1 | * | 11/2012 | Harada | B25J 15/0057 294/213 |

FOREIGN PATENT DOCUMENTS

| | | |
|---|---|---|
| JP | 2000317874 A | 11/2000 |
| JP | 2001180882 A | 7/2001 |

OTHER PUBLICATIONS

English abstract and machine translation for Japanese Publication No. JP 2001-180882, published Jul. 3, 2001, 5 pgs.
English Abstract and Machine Translation for Japanese Publication No. 04-266331 A, published Sep. 22, 1992, 6 pgs.
English Abstract and Machine Translation for Japanese Publication No. 61-201750 U, published Dec. 18, 1986, 5 pgs.

* cited by examiner

ROBOT HAND FOR HOLDING OBJECT, ROBOT, ROBOT SYSTEM, AND METHOD OF HOLDING OBJECT

BACKGROUND ART

1. Technical Field

The invention relates to a robot hand for holding an object, a robot, a robot system, and a method of holding the object.

2. Description of Related Art

There is known a robot for adsorbing an object by using an adsorption part such as an electromagnet to hold the object, and for conveying the object (e.g., Japanese Laid-open Patent Publication Nos. 2000-317874 and 2001-180882).

Conventional devices could not be applied for holding various types of objects different in size or shape.

SUMMARY OF INVENTION

In an aspect of the invention, a robot hand for holding an object, includes a hand base; a first hand arm attached to the hand base and having a first butting part and a first adsorption part which is disposed adjacently to the first butting part and which is able to adsorb the object; a second hand arm attached to the hand base and having a second butting part and a second adsorption part which is disposed adjacently to the second butting part and which is able to adsorb the object; and a driving mechanism for moving the first hand arm and the second hand arm relative to each other so as to approach each other or separate from each other.

The driving mechanism may include a first driving mechanism for moving the first hand arm; and a second driving mechanism for moving the second hand arm. The first butting part may extend orthogonally to an adsorption surface of the first adsorption part. The second butting part may extend orthogonally to an adsorption surface of the second adsorption part.

The first hand arm may include a third adsorption part disposed adjacently to the first adsorption part. The first butting part may be disposed between the first adsorption part and the third adsorption part. The second hand arm may include a fourth adsorption part disposed adjacently to the second adsorption part. The second butting part may be disposed between the second adsorption part and the fourth adsorption part.

In another aspect of the invention, a robot includes the above-described robot hand; and a manipulator to which the hand base is attached.

In yet another aspect of the invention, a robot system includes the above-described robot; and a controller for controlling the robot. The controller is configured to control the manipulator to move the hand base to a predetermined position.

The controller is configured to control the driving mechanism to move the first and second hand arms relative to each other so that the first and second butting parts butt against the object. The controller is configured to control the manipulator to move the hand base so as to contact the first and second adsorption parts with the object. The controller is configured to adsorb the object by the first and second adsorption parts.

In yet another aspect of the invention, a method of holding an object with the above-described robot, includes the steps of moving the hand base to a predetermined position; moving the first and second hand arms relative to each other so that the first and second butting parts butt against the object; moving the hand base to contact the first and second adsorption parts with the object; and adsorbing the object by the first and second adsorption parts.

BRIEF DESCRIPTION OF DRAWINGS

The above-described or other objects, features, and advantages of the invention will become more apparent from the following description of the preferred embodiments of the invention referring to the accompanying drawings, in which.

DETAILED DESCRIPTION

Figure 1:
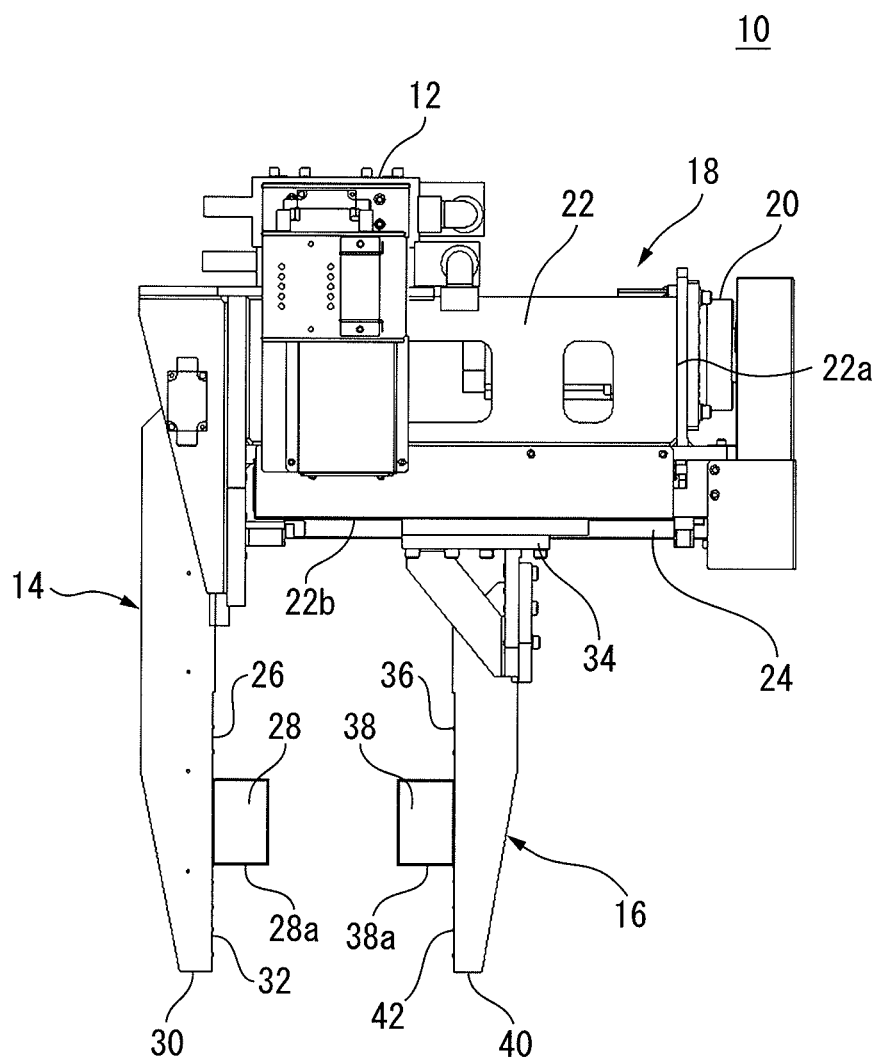
FIG. 1 is an appearance diagram of a robot hand according to an embodiment of the invention.

Hereinafter, the embodiments of the invention will be described in detail with reference to the accompanying drawings. First, referring to FIG. 1, a robot hand 10 according to an embodiment of the invention will be described. Note that, the right-left direction and the up-down direction in the following description respectively correspond to the right-left direction and the up-down direction in FIG. 1. The robot hand 10 includes a hand base 12, a first hand arm 14, a second hand arm 16, and a driving mechanism 18.

The hand base 12 is attached to e.g. a manipulator of a robot. The driving mechanism 18 is installed below the hand base 12. The driving mechanism 18 includes a servo motor 20; a hollow enclosure 22 fixed to the lower side of the hand base 12; a rail 24 fixed to the enclosure 22; and a ball screw mechanism (not shown) housed in the enclosure 22. The rail 24 is provided at the lower end 22b of the enclosure 22 so as to extend straightly in the right-left direction. The ball screw mechanism includes a screw shaft extending in the right-left direction in the enclosure 22.

The servo motor 20 is fixed to the right end 22a of the enclosure 22. An output shaft (not shown) of the servo motor 20 is mechanically connected to the screw shaft of the ball screw mechanism. The servo motor 20 drives the output shaft to rotate in accordance with a command from a controller (not shown) installed outside.

The first hand arm 14 is fixed to the hand base 12, and extends downward from the hand base 12. A first adsorption part 28 is fixed to the inner surface 26 of the first hand arm 14. The inner surface 26 is a plane facing the second hand arm 16, and extends in the up-down direction. The first adsorption part 28 is arranged at an upper position than the tip 30 of the first hand arm 14 by a predetermined distance.

The first adsorption part 28 is configured by e.g. an electromagnet, an air suction adsorber, or a sucker, and can adsorb an object such as a workpiece on an adsorption surface 28a. In the embodiment, the adsorption surface 28a is disposed to be substantially orthogonal to the up-down direction. A portion 32 of the inner surface 26 of the first hand arm 14 located between the tip 30 of the first hand arm 14 and the adsorption surface 28a of the first adsorption part 28 functions as a first butting part.

That is, in the embodiment, the first hand arm 14 includes the first butting part 32 as a lower end region of the inner surface 26. The first butting part 32 is adjacent to the lower side of the adsorption surface 28a of the first adsorption part 28, and orthogonal to the adsorption surface 28a of the first adsorption part 28. The function of the first butting part 32 will be described below.

The second hand arm 16 is attached to the rail 24 via a connection 34. The connection 34 is slidably fitted to the rail 24 while engaging the screw shaft of the ball screw mechanism. The second hand arm 16 is fixed to the connection 34 by e.g. a bolt, and extends downward from the connection 34.

When the servo motor 20 drives the output shaft to rotate in one direction, the screw shaft of the ball screw mechanism is rotated. Along with the rotation of the screw shaft, the connection 34 is driven leftward. Thus, the second hand arm 16 is moved in the left direction, i.e., the direction to approach the first hand arm 14, by the servo motor 20.

On the other hand, when the servo motor 20 drives the output shaft to rotate in the other direction, the connection 34 is driven rightward via the screw shaft of the ball screw mechanism. Thus, the second hand arm 16 is moved in the right direction, i.e., the direction away from the first hand arm 14, by the servo motor 20.

A second adsorption part 38 is fixed to the inner surface 36 of the second hand arm 16. The inner surface 36 is a plane facing the first hand arm 14, and extends in the up-down direction. In the embodiment, the inner surface 26 of the first hand arm 14 and the inner surface 36 of the second hand arm 16 face each other in parallel.

The second adsorption part 38 is arranged at an upper position than a tip 40 of the second hand arm 16 by a predetermined distance. Similar to the first adsorption part 28, the second adsorption part 38 is configured by e.g. an electromagnet, an air suction adsorber, or a sucker, and can adsorb an object on an adsorption surface 38a. In the embodiment, the adsorption surface 38a is disposed to be substantially orthogonal to the up-down direction. Further, the adsorption surfaces 28a and 38a are disposed substantially at the same position in the up-down direction.

A portion 42 of the inner surface 36 of the second hand arm 16 located between the tip 40 of the second hand arm 16 and the adsorption surface 38a of the second adsorption part 38 functions as a second butting part. That is, in the embodiment, the second hand arm 16 includes the second butting part 42 as a lower end region of the inner surface 36. The second butting part 42 is adjacent to the lower side of the adsorption surface 38a of the second adsorption part 38, and orthogonal to the adsorption surface 38a of the second adsorption part 38. The function of the second butting part 42 will be described below.

Figure 2:
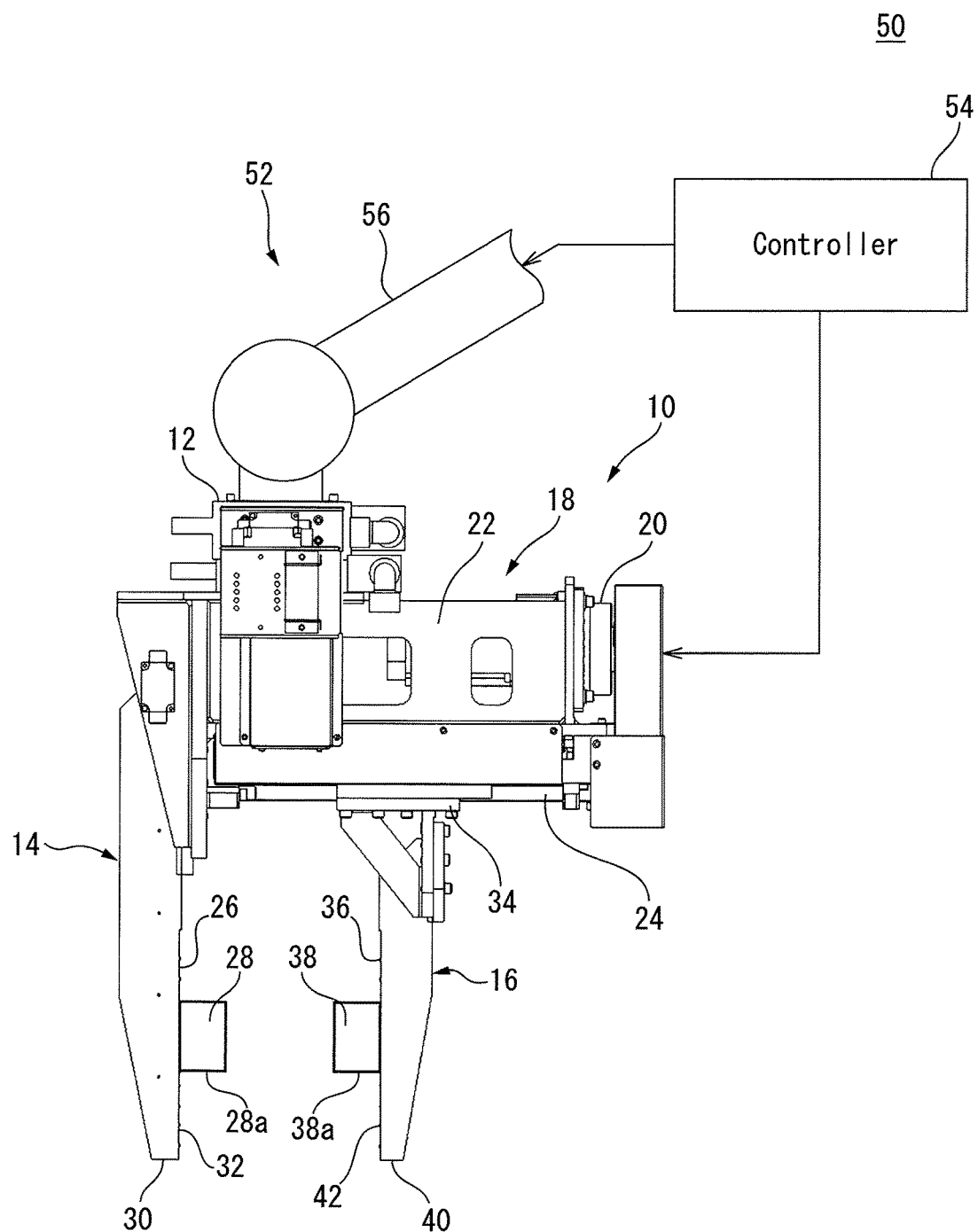
FIG. 2 is a block diagram of a robot system according to an embodiment of the invention.

Next, referring to FIG. 2, a robot system 50 according to an embodiment of the invention will be described. The robot system 50 includes a robot 52 and a controller 54 for controlling the robot 52. The robot 52 includes the above-described robot hand 10, and a manipulator 56 to which the hand base 12 of the robot hand 10 is attached.

The controller 54 controls the operations of the robot hand 10 and the manipulator 56. Specifically, the controller 54 operates the manipulator 56 in accordance with a robot program so as to arrange the hand base 12 of the robot hand 10 at a predetermined position. The controller 54 sends a command to the servo motor 20 so as to move the second hand arm 16 via the above-described ball screw mechanism.

Figure 3:
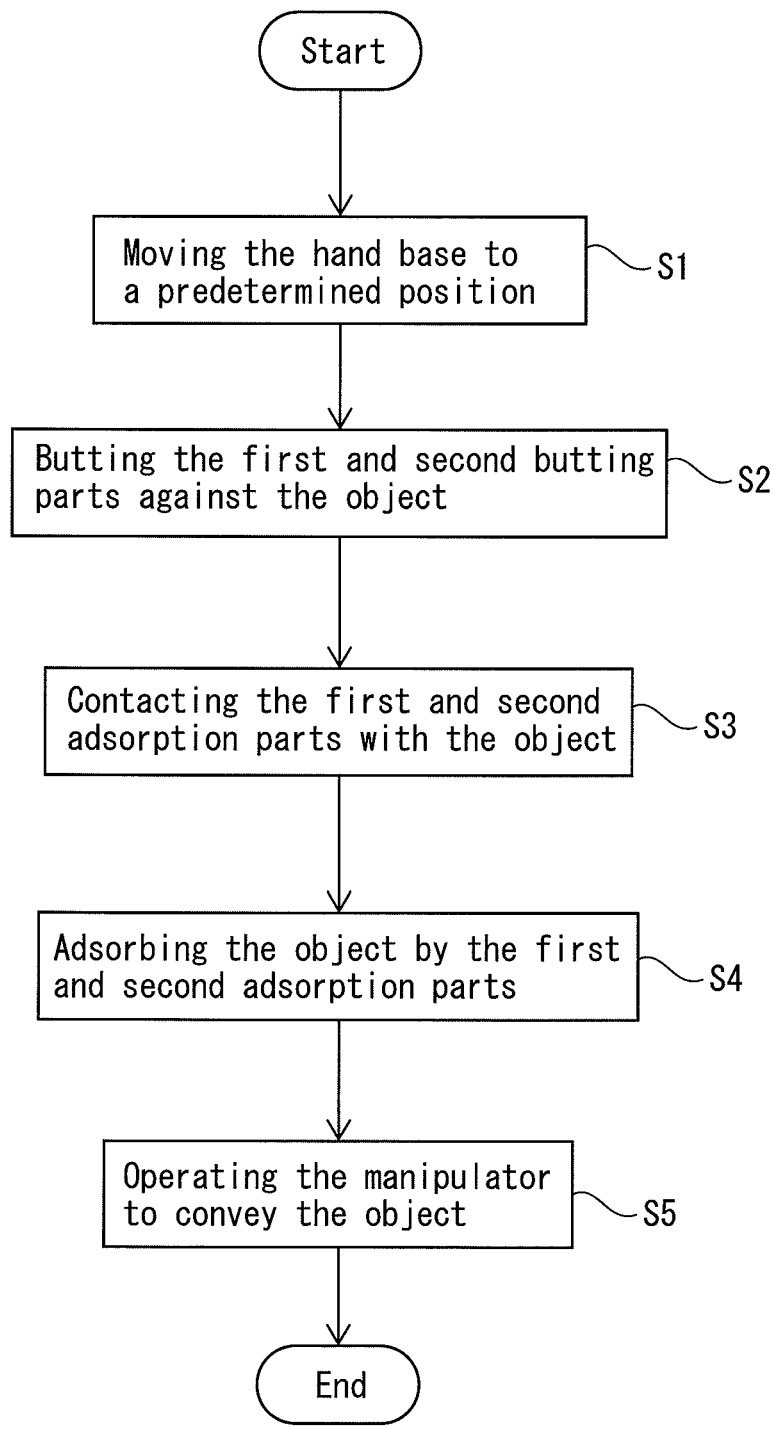
FIG. 3 is a flowchart illustrating an operation flow of a robot system shown in FIG. 2.
Figure 4:
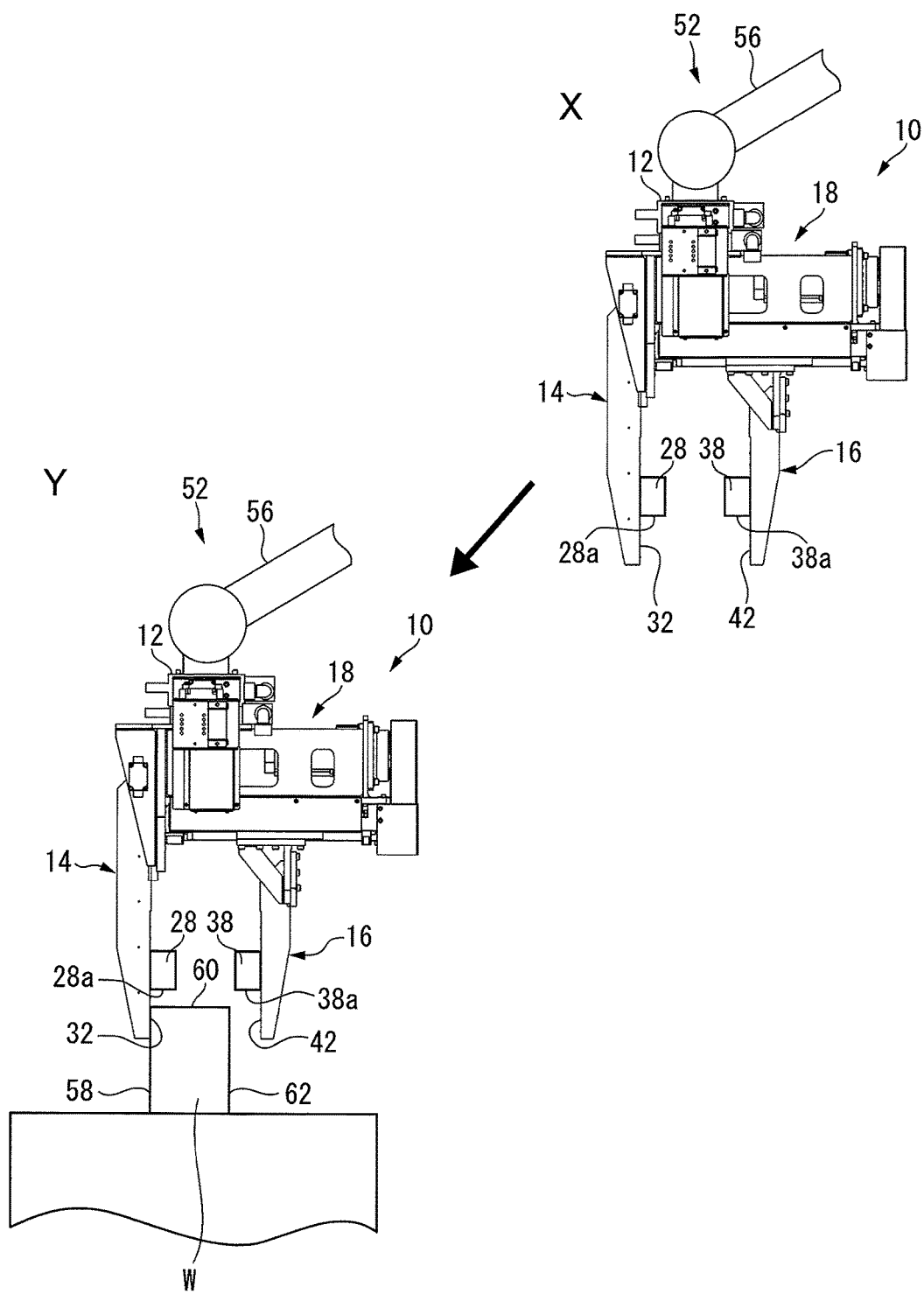
FIG. 4 is a diagram for explaining an operation of a robot at Step S1 in FIG. 3.

Next, referring to FIGS. 2 to 6, an operation of the robot system 50 according to the present embodiment will be described. FIG. 3 shows an operation flow for holding a workpiece W (FIG. 4) as an object by the robot hand 10, and conveying the workpiece W to a predetermined target place. The operation flow is started when the controller 54 receives an operation command from a user.

At Step S1, the controller 54 moves the hand base 12 of the robot hand 10 to a predetermined position. Specifically, the controller 54 operates the manipulator 56 in accordance with the pre-stored robot program so as to move the hand base 12 from an initial position "X" shown in FIG. 4 to a pre-operation position "Y."

The robot program includes an operation command for the manipulator 56 in order to move the hand base 12 to the pre-operation position "Y" by the manipulator 56. The robot program is constructed by teaching the robot 52 the path from the arrangement of the manipulator 56 at the initial position "X" to the arrangement of the manipulator 56 at the pre-operation position "Y."

By Step S1, the first butting part 32 is arranged so as to be lightly contact one side face 58 of the workpiece W, or to be slightly separated from the side face 58. At this time, the adsorption surface 28a is arranged so as to be slightly separated upward from an upper surface 60 of the workpiece W which intersects the side face 58. On the other hand, the second butting part 42 is arranged so as to be separated rightward from a side face 62 of the workpiece W opposite the side face 58.

At Step S2, the controller 54 moves the first hand arm 14 and second hand arm 16 relative to each other so that the first butting part 32 and second butting part 42 butt against the workpiece W. Specifically, the controller 54 sends a command to the servo motor 20 so as to rotate the screw shaft of the ball screw mechanism.

Figure 5:
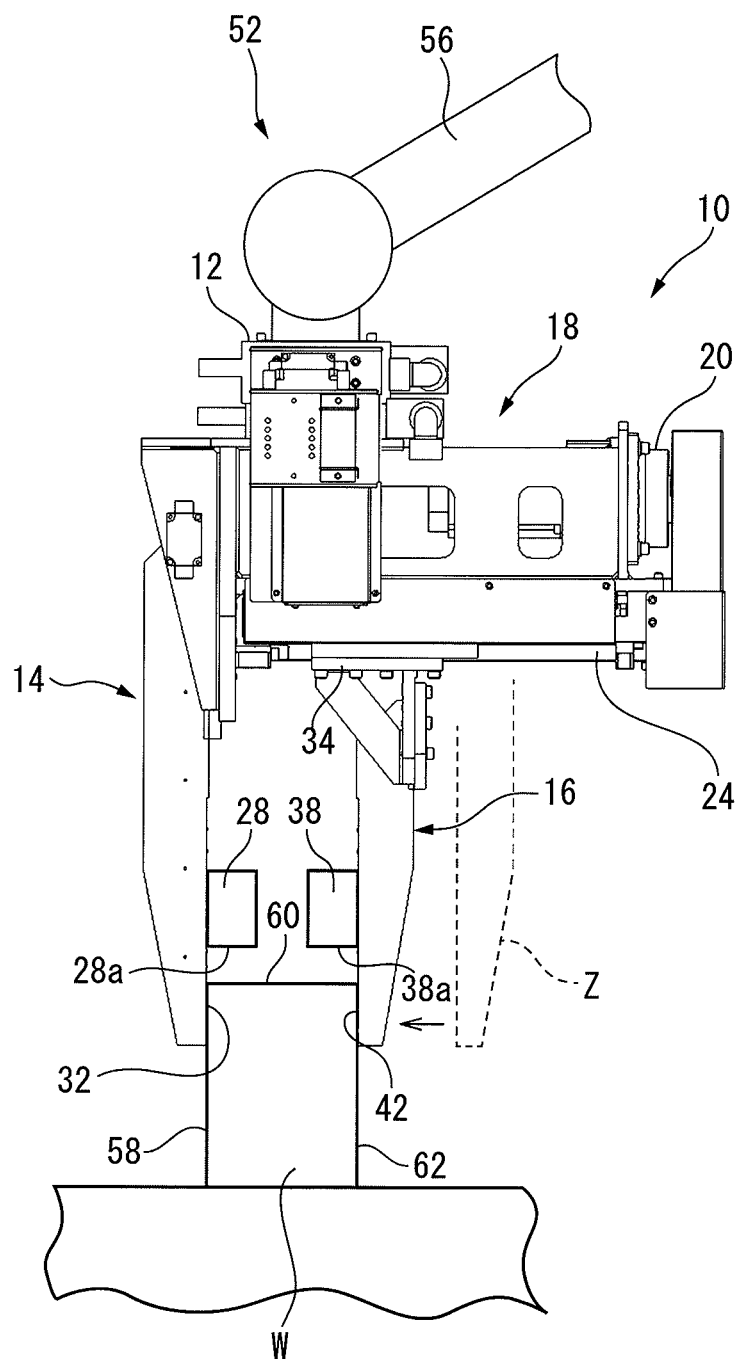
FIG. 5 is a diagram for explaining an operation of the robot at Step S2 in FIG. 3.

Along with the rotation of the screw shaft, the second hand arm 16 moves leftward from a position indicated by a dotted line "Z" shown in FIG. 5 along the rail 24. Then, the second butting part 42 is butted against the side face 62 of the workpiece W, and also the first butting part 32 is butted against the side face 58 of the workpiece W. This state is shown in FIG. 5.

As shown in FIG. 5, when the first butting part 32 is butted against the side face 58 of the workpiece W, the adsorption surface 28a disposed adjacent to the upper side of the first butting part 32 is positioned just above the upper surface 60 of the workpiece W which intersects the side face 58. Similarly, when the second butting part 42 is butted against the side face 62 of the workpiece W, the adsorption surface 38a disposed adjacent to the upper side of the second butting part 42 is positioned just above the upper surface 60 of the workpiece W which intersects the side face 62.

Thus, the first butting part 32 and second butting part 42 according to the present embodiment respectively function as positioning elements for appropriately positioning the first adsorption part 28 and second adsorption part 38 with respect to the workpiece W.

Figure 6:
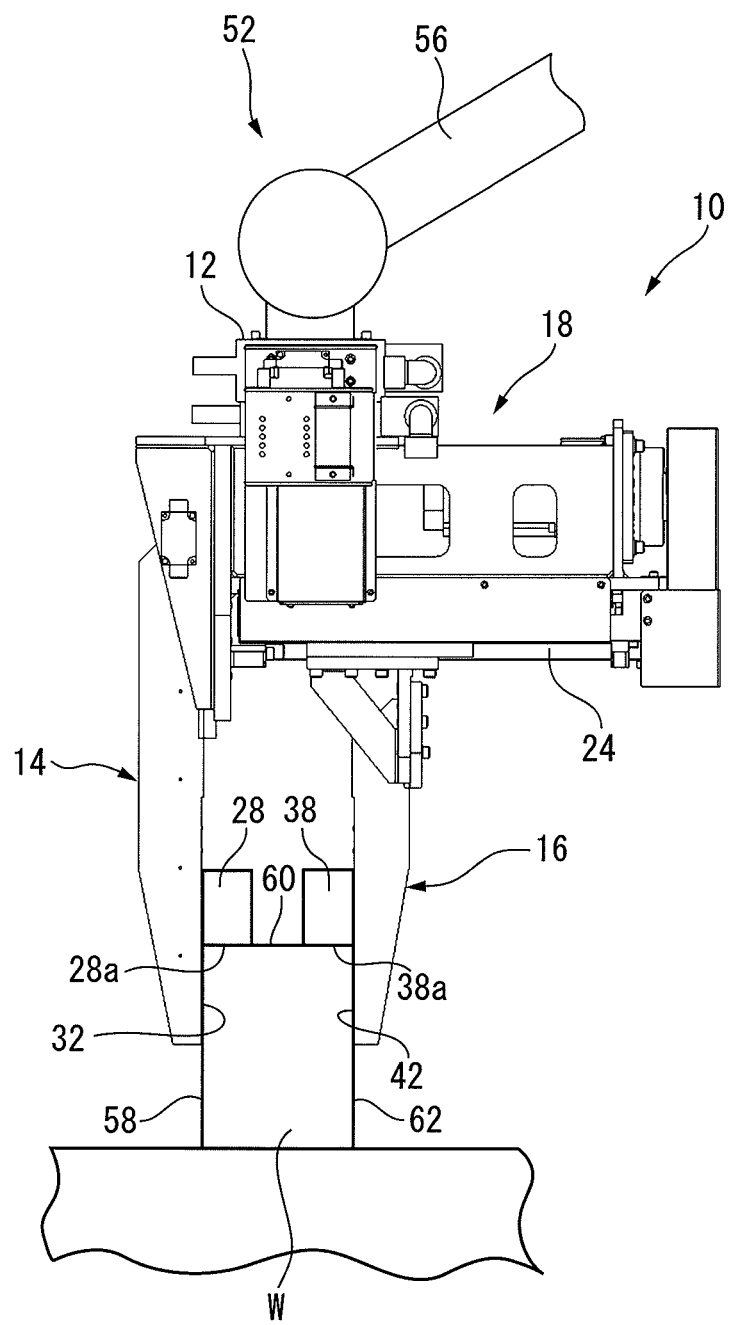
FIG. 6 is a diagram for explaining an operation of the robot at Step S3 in FIG. 3.

At Step S3, the controller 54 moves the hand base 12 so as to contact the first and second adsorption parts 28 and 38 with the workpiece W. Specifically, the controller 54 operates the manipulator 56 so as to move the hand base 12 downward until the first and second adsorption parts 28 and 38 come into contact with the upper surface 60 of the workpiece W. This state is shown in FIG. 6.

At Step S4, the controller 54 adsorbs the workpiece W by the first and second adsorption parts 28 and 38. For example, when the first and second adsorption parts 28 and 38 are made of electromagnets and the workpiece W is made of a magnetic material, the controller 54 applies voltages to the first and second adsorption parts 28 and 38, and make the first and second adsorption parts 28 and 38 to adsorb the workpiece W by an electromagnetic force. At Step S5, the controller 54 operates the manipulator 56 to move the robot hand 10 to the predetermined target place. Whereby, the workpiece W can be conveyed to the target place.

As described above, in the present embodiment, when adsorbing the workpiece W, the first butting part 32 and second butting part 42 are moved relative to each other so as to butt against the workpiece W, then the first adsorption part 28 and second adsorption part 38 are appropriately positioned with respect to the workpiece W based on the first and second butting parts 32 and 42.

According to this configuration, it is possible to appropriately position the first adsorption part 28 and second adsorption part 38 with respect to the workpiece W of any size or shape. Therefore, it is possible to apply the robot system 50 according to the embodiment to an application for holding various types of workpieces W having different sizes or shapes.

Further, according to the embodiment, the adsorption surface 28a of the first adsorption part 28 is disposed to be adjacent to the upper side of the first butting part 32, to be orthogonal to the first butting part 32, and to extend toward right side of the first butting part 32 (i.e., extend in a direction in which the first butting part 32 butts against workpiece W). In addition, the adsorption surface 38a of the second adsorption part 38 is disposed to be adjacent to the upper side of the second butting part 42, to be orthogonal to the second butting part 42, and to extend toward left side of the second butting part 42 (i.e., extend in a direction in which the second butting part 42 butts against the workpiece W).

According to this configuration, when the first and second butting parts 32 and 42 are butted against the workpiece W, the adsorption surfaces 28a and 38a can be positioned just above the upper surface 60 of the workpiece W. Due this, it is possible to adsorb the upper surface 60 of the workpiece W from upper side by the adsorption surfaces 28a and 38a, whereby the workpiece W can be adsorbed and lifted more stably.

Next, referring to FIGS. 7 and 8, a robot hand 70 according to another embodiment of the invention will be described. Note that, the up-down direction in the following description indicates the up-down direction in FIG. 7, i.e., the direction along an axis O shown in FIG. 7. In addition, the radial direction in the following description indicates a radial direction of a circle centered about the axis O, and the circumferential direction in the following description indicates a circumferential direction of the circle about the axis O. The robot hand 70 includes a hand base 72, a first hand arm 74, a second hand arm 76, a third hand arm 78, and a driving mechanism 80.

The hand base 72 is fixed to a wrist 86, and attached to e.g. a manipulator of a robot via the wrist 86. The hand base 72 includes a base part 88; and first, second and third supports 90, 92, and 94 fixed to the lower end of the base part 88. The base part 88 is a circular plate-shaped member which is centered about the axis O. Each of the first to third supports 90, 92, and 94 is configured by a pair of triangular plates disposed to face each other.

The driving mechanism 80 includes a ball screw mechanism housing 82 and a servo motor 84 installed at the ball screw mechanism housing 82. The ball screw mechanism housing 82 is supported by the first to third supports 90, 92, and 94 so as to be arranged below the base part 88. The ball screw mechanism housing 82 is a hollow member having a three-pronged shape when viewed from upper side thereof, and houses a total of three ball screw mechanisms described below.

Figure 7:
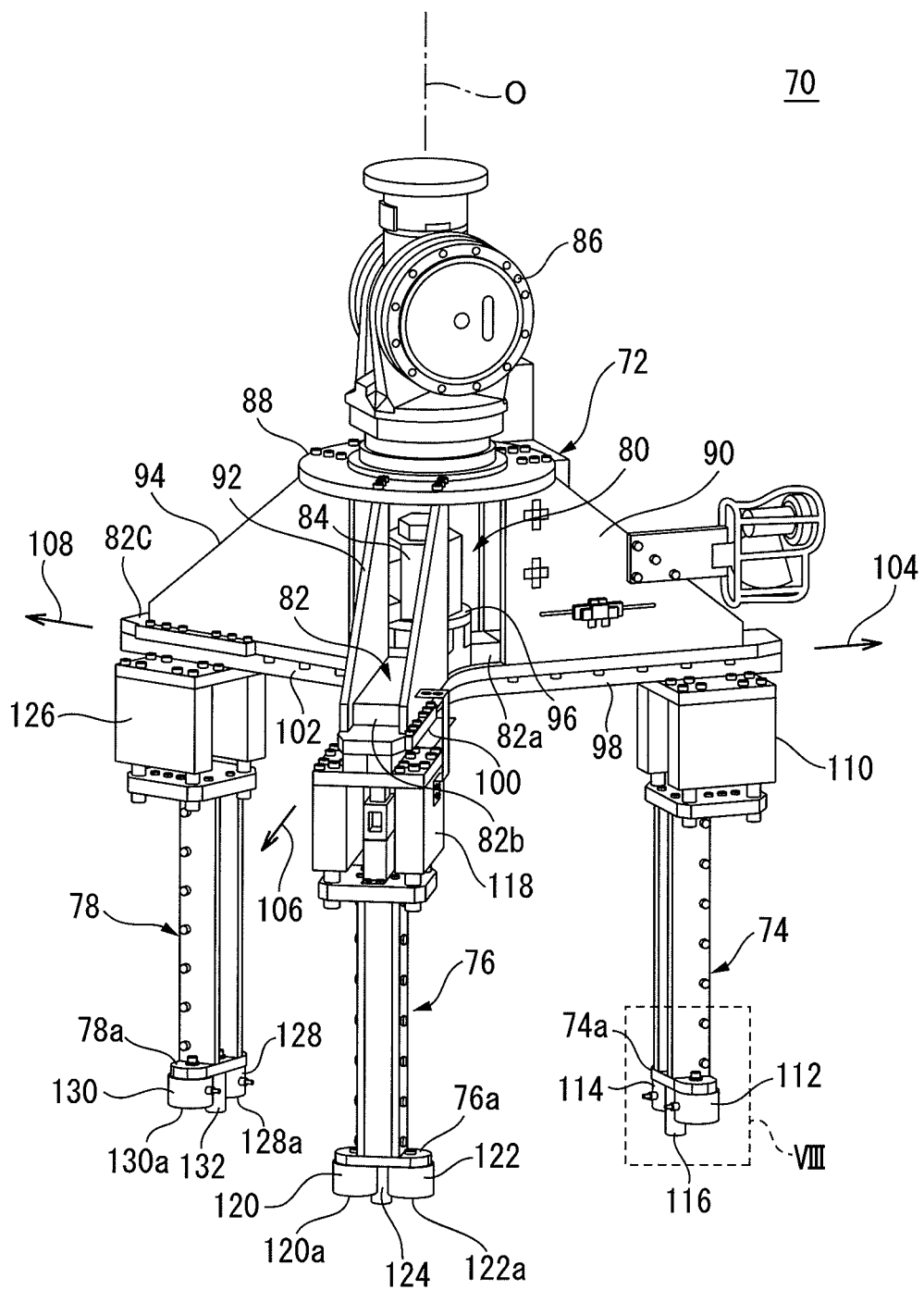
FIG. 7 is an appearance diagram of a robot hand according to another embodiment of the invention.

More specifically, the ball screw mechanism housing 82 includes a first part 82a extending in a first direction 104 shown in FIG. 7; a second part 82b extending in a second direction 106; and a third part 82c extending in a third direction 108. The first to third directions 104, 106, and 108 are different from one another, orthogonal to the axis O, and directed from the axis O to the outside in the radial direction.

In the embodiment, the second direction 106 is a direction rotated from the first direction 104 by 120° in one circumferential direction. Further, the third direction 108 is a direction rotated from the first direction 104 by 120° in the other circumferential direction. A first ball screw mechanism (not shown) is housed inside of the first part 82a of the ball screw mechanism housing 82. The first ball screw mechanism includes a first screw shaft (not shown) extending in the first direction 104 in the first part 82a.

A second ball screw mechanism (not shown) is housed inside of the second part 82b of the ball screw mechanism housing 82. The second ball screw mechanism includes a second screw shaft (not shown) extending in the second direction 106 in the second part 82b. Further, a third ball screw mechanism (not shown) is housed inside of the third part 82c of the ball screw mechanism housing 82. The third ball screw mechanism includes a third screw shaft (not shown) extending in the third direction 108 in the third part 82c.

The servo motor 84 is fixed on the center part 96 of the ball screw mechanism housing 82. The output shaft (not shown) of the servo motor 84 extends into the ball screw mechanism housing 82. The center part 96 of the ball screw mechanism housing 82 is disposed so as to be centered about axis O. The servo motor 84 drives the output shaft to rotate in accordance with a command from a controller (not shown) installed outside.

The driving mechanism 80 further includes a first rail 98 fixed below the first part 82a of the ball screw mechanism housing 82; a second rail 100 fixed below the second part 82b of the ball screw mechanism housing 82; and a third rail 102 fixed below the third part 82c of the ball screw mechanism housing 82.

The first rail 98 extends from the center part 96 in the first direction 104. The second rail 100 extends from the center part 96 in the second direction 106. The third rail 102 extends from the center part 96 in the third direction 108.

A bevel gear is fixed to a tip of the output shaft of the servo motor 84. Further, a gear is fixed to the proximal end of each of the first to third screw shafts. The gears of the first to third screw shafts are engaged with the bevel gear of the output shaft. Due to this configuration, the first to third screw shafts are rotated along with the rotation of the output shaft of the servo motor 84.

The first hand arm 74 is attached to the first rail 98 via a connection 110. The connection 110 is slidably fitted to the first rail 98, and engages the first screw shaft. The first hand arm 74 is fixed to the connection 110 by e.g. a bolt, and extends downward from the connection 110.

Figure 8:
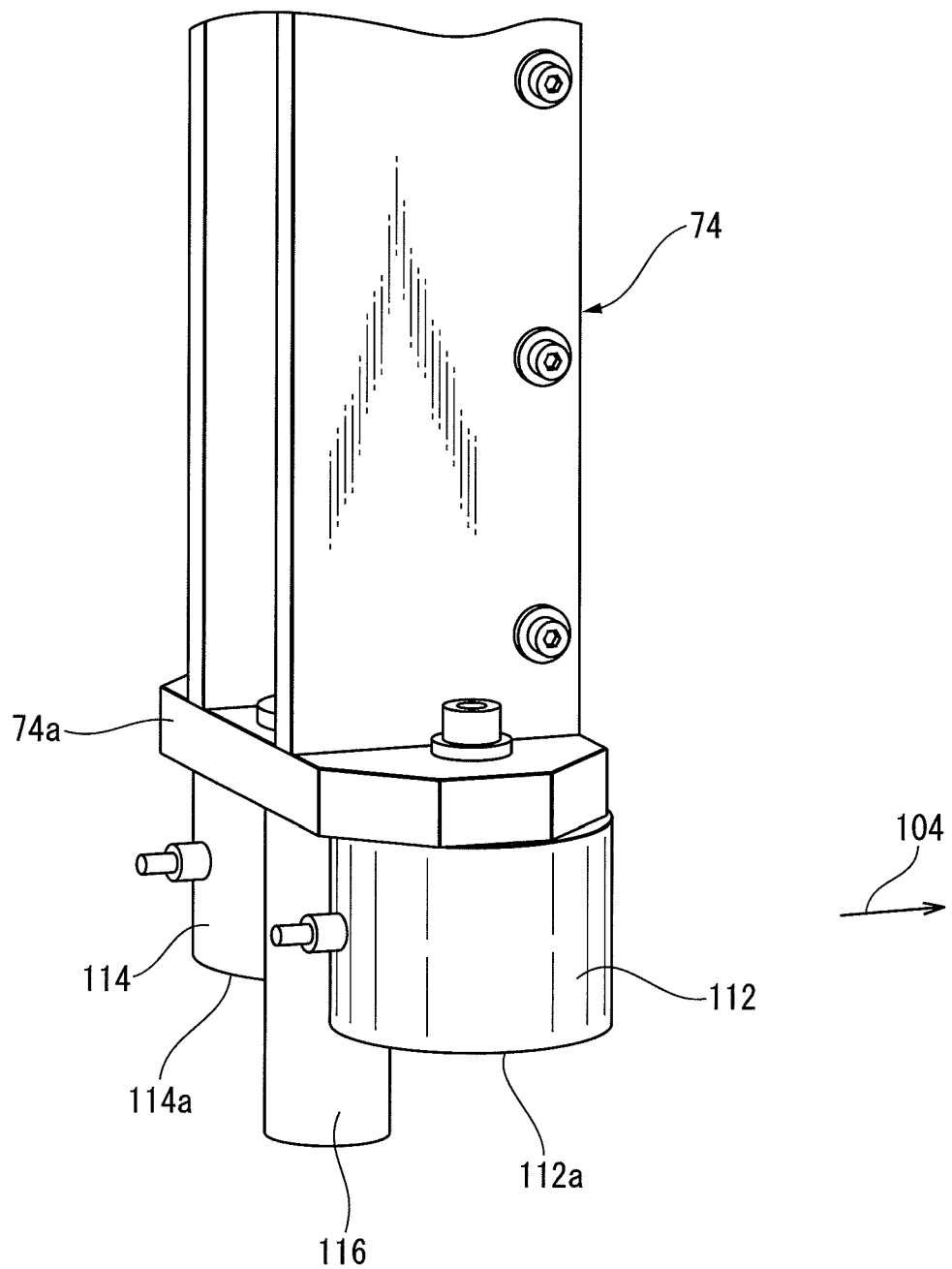
FIG. 8 is an enlarged diagram of the region VIII in FIG. 7.

As shown in FIG. 8, a pair of adsorption parts 112 and 114 disposed adjacent to each other is fixed to a lower end 74a of the first hand arm 74. The adsorption parts 112 and 114 are configured by e.g. electromagnets, air suction adsorbers, or suckers, and can adsorb an object such as a workpiece on respective adsorption surfaces 112a and 114a. The adsorption surfaces 112a and 114a are disposed to be substantially orthogonal to the axis O, and arranged at substantially the same position in the up-down direction (i.e., the direction of the axis O).

A first butting part 116 is fixed to the lower end 74a of the first hand arm 74 so as to extend downward from the lower end 74a. The first butting part 116 according to the present embodiment is a cylindrical rod member disposed between the adsorption parts 112 and 114. The first butting part 116 extends to lower side of the adsorption surfaces 112a and 114a. Further, the adsorption surfaces 112a and 114a are disposed to protrude in the first direction 104 relative to the first butting part 116.

The second hand arm 76 has a configuration similar to the first hand arm 74. Specifically, the second hand arm 76 is attached to the second rail 100 via a connection 118. The connection 118 is slidably fitted to the second rail 100 and engages the second screw shaft.

A pair of adsorption parts 120 and 122 disposed adjacent to each other is fixed to a lower end 76a of the second hand arm 76. The adsorption surfaces 120a and 122a of the adsorption parts 120 and 122 are disposed to be substantially orthogonal to the axis O, and arranged substantially at the same position in the up-down direction. A second butting part 124 is fixed to the lower end 76a of the second hand arm 76 so as to extend downward from the lower end 76a. The second butting part 124 is disposed between the adsorption parts 120 and 122, and extends to lower side of the adsorption surfaces 120a and 122a. The adsorption surfaces 120a and 122a are disposed to protrude in the second direction 106 relative to the second butting part 124.

The third hand arm 78 also has a configuration similar to the first hand arm 74. Specifically, the third hand arm 78 is attached to the third rail 102 via a connection 126. The connection 126 is slidably fitted to the third rail 102, and engages the third screw shaft. A pair of adsorption parts 128 and 130 disposed adjacent to each other is fixed to a lower end 78a of the third hand arm 78. The adsorption surfaces 128a and 130a of the adsorption parts 128 and 130 are disposed to be substantially orthogonal to the axis O, and arranged substantially at the same position in the up-down direction.

A third butting part 132 is fixed to the lower end 78a of the third hand arm 78 so as to extend downward from the lower end 78a. The third butting part 132 is disposed between the adsorption parts 128 and 130, and extends to lower side of the adsorption surfaces 128a and 130a. The adsorption surfaces 128a and 130a are disposed to protrude in the third direction 108 relative to the third butting part 132.

Figure 9:
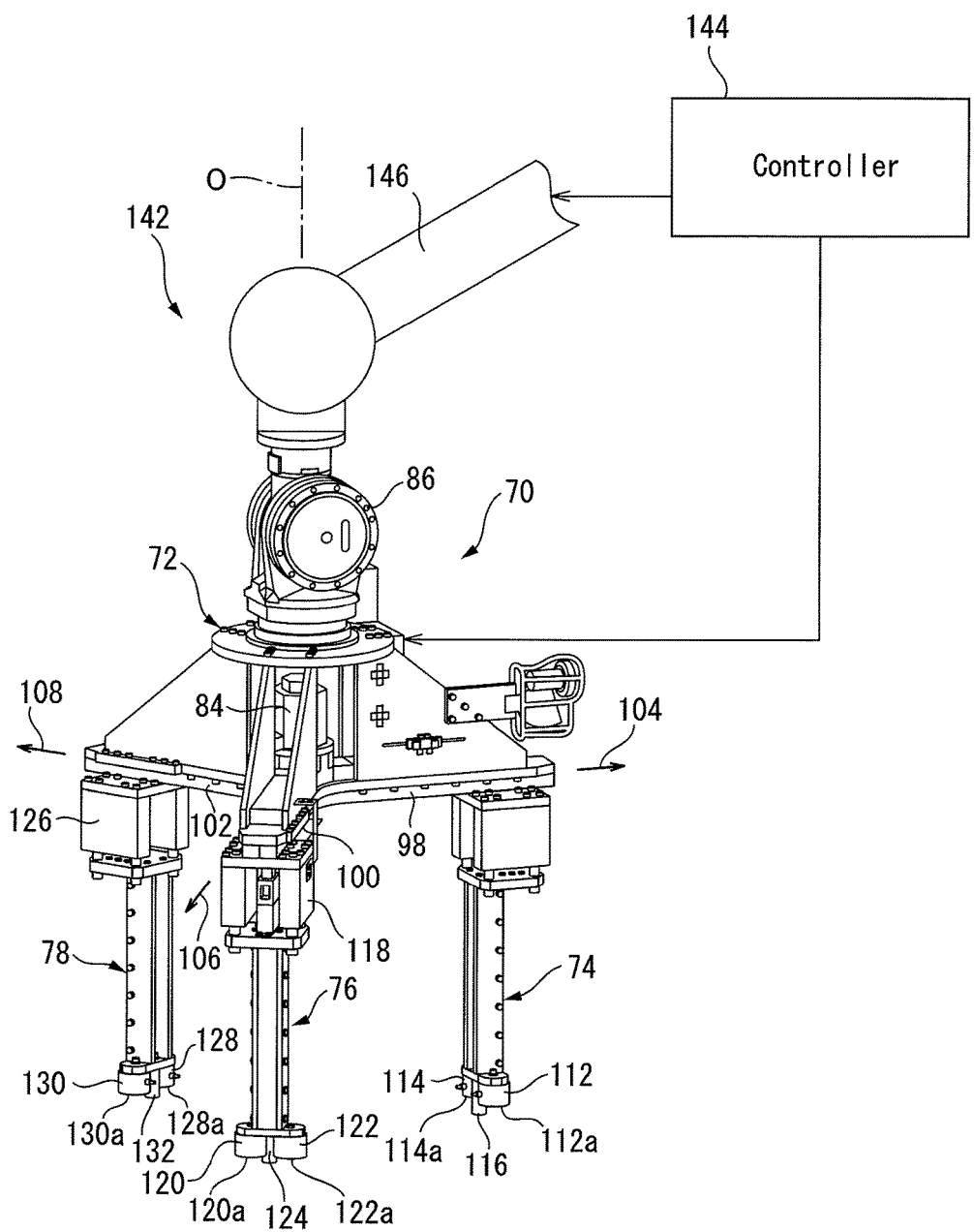
FIG. 9 is a block diagram of a robot system according to another embodiment of the invention.

Next, referring to FIG. 9, a robot system 140 according to another embodiment of the invention will be described. The robot system 140 includes a robot 142 and a controller 144 for controlling the robot 142. The robot 142 includes the above-described robot hand 70, and a manipulator 146 for moving the robot hand 70. The hand base 72 of the robot hand 70 is attached to the manipulator 146 via the wrist 86.

The controller 144 controls operations of the robot hand 70 and the manipulator 146. Specifically, the controller 144 operates the manipulator 146 in accordance with a robot program so as to arrange the hand base 72 of the robot hand 70 at a predetermined position. The controller 144 sends a command to the servo motor 84 so as to respectively move the first to third hand arms 74, 76, and 78 via the above-described first to third ball screw mechanisms.

Figure 10:
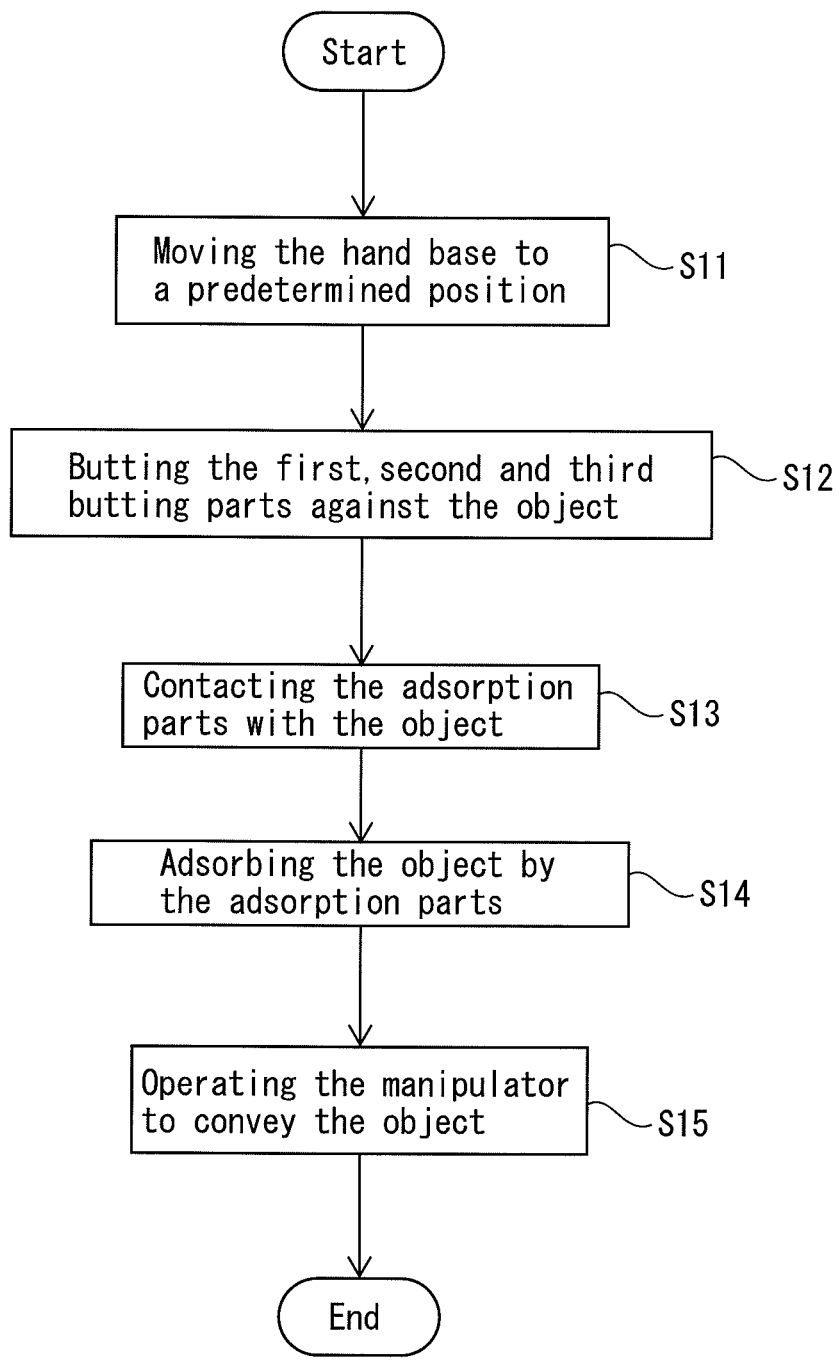
FIG. 10 is a flowchart illustrating an operation flow of the robot system shown in FIG. 9.

Next, referring to FIGS. 9 to 13, the operation of the robot system 140 according to the present embodiment will be described. FIG. 10 shows an operation flow for holding a cylindrical workpiece W shown in FIG. 11 by the robot hand 70, and conveying the workpiece W to a predetermined target place. This operation flow is started when the controller 144 receives an operation command from a user.

Figure 11:
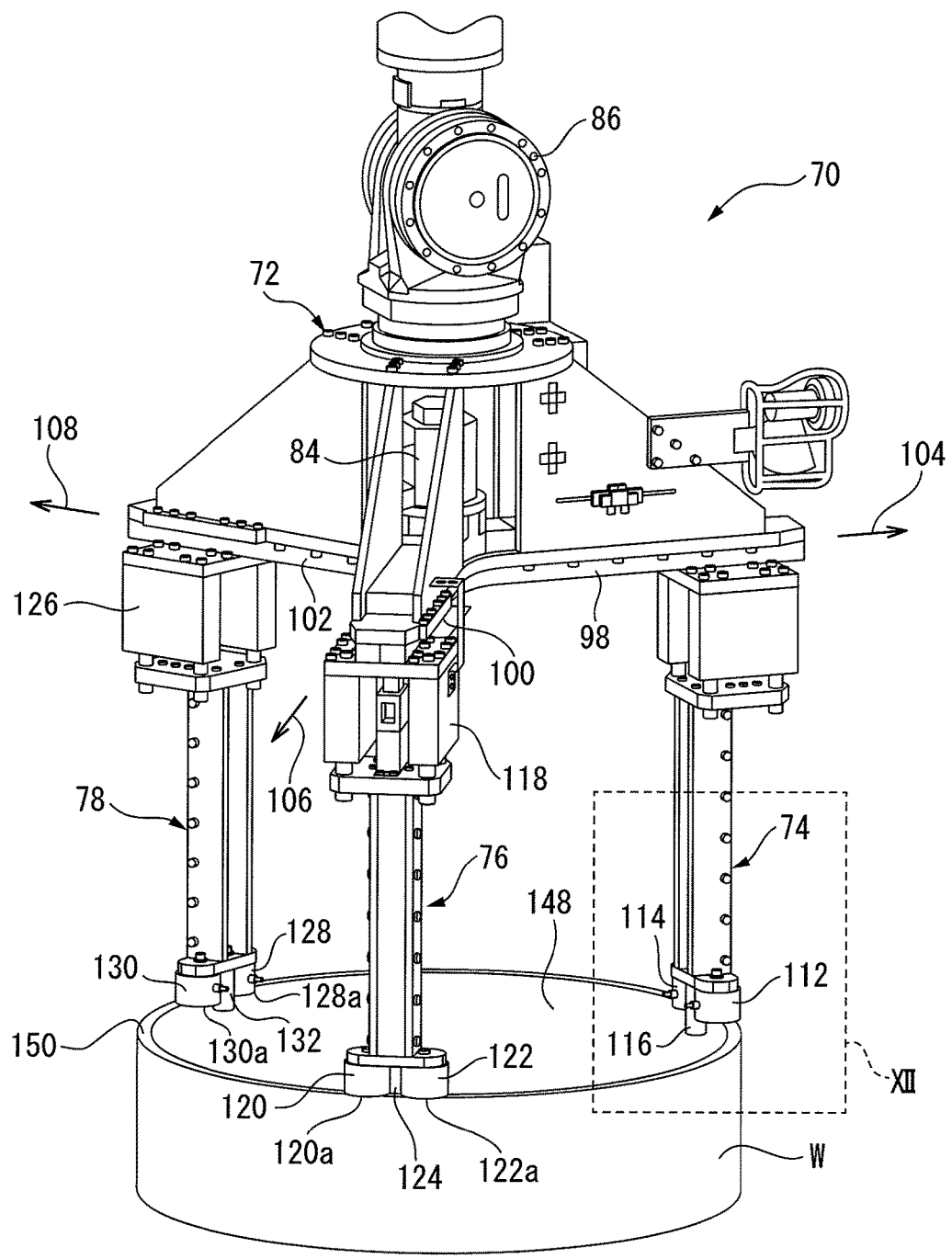
FIG. 11 is a diagram for explaining an operation of the robot at Step S11 in FIG. 10.
Figure 12:
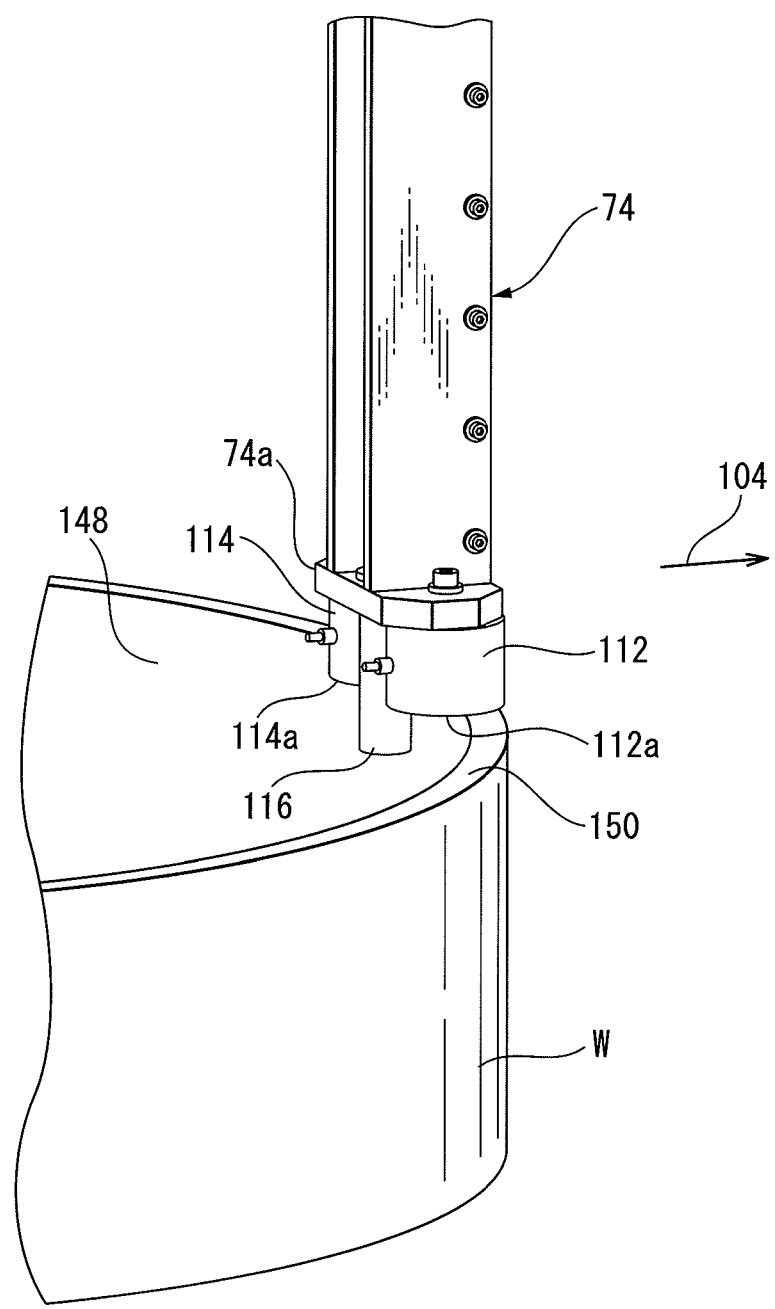
FIG. 12 is an enlarged diagram of the region XII in FIG. 11.

At Step S11, the controller 144 moves the hand base 72 of the robot hand 70 to a predetermined position. Specifically, the controller 144 operates the manipulator 146 in accordance with the pre-stored robot program so as to move the hand base 72 from an initial position to a pre-operation position. This state is illustrated in FIGS. 11 and 12.

At this time, the first butting part 116 is arranged radially inside of the inner peripheral surface 148 of the workpiece W so as to be separated from the inner peripheral surface 148 (i.e., separated in the direction opposite first direction 104). Further, the adsorption surfaces 112a and 114a are arranged to be slightly separated upward from the upper surface 150 of the workpiece W which intersects the inner peripheral surface 148.

Similarly, the second butting part 124 is arranged radially inside of the inner peripheral surface 148 of the workpiece W so as to be separated from the inner peripheral surface 148 (i.e., separated in the direction opposite the second direction 106). The adsorption surfaces 120a and 122a are arranged to be slightly separated upward from the upper surface 150 of the workpiece W.

Similarly, the third butting part 132 is arranged radially inside of the inner peripheral surface 148 of the workpiece W so as to be separated from the inner peripheral surface 148 (i.e., separated in the direction opposite third direction 108). The adsorption surfaces 128a and 130a are arranged to be slightly separated upward from the upper surface 150 of the workpiece W.

At Step S12, the controller 144 moves the first to third hand arms 74, 76, and 78 relative to one another so that the first to third butting parts 116, 124, and 132 butt the workpiece W. Specifically, the controller 144 sends a command to the servo motor 84 so as to rotate the first to third screw shafts of the first to third ball screw mechanisms.

Along with the rotation of the first screw shaft, the first hand arm 74 moves in the first direction 104 along the first rail 98. Thus, in the embodiment, the servo motor 84, the first ball screw mechanism, and the first rail 98 constitute a first driving mechanism for moving the first hand arm 74.

Similarly, along with the rotation of the second screw shaft, the second hand arm 76 moves in the second direction 106 along the second rail 100. Thus, in the embodiment, the servo motor 84, the second ball screw mechanism, and the second rail 100 constitute a second driving mechanism for moving the second hand arm 76.

Similarly, along with the rotation of the third screw shaft, the third hand arm 78 moves in the third direction 108 along the third rail 102. Thus, in the embodiment, the servo motor 84, the third ball screw mechanism, and the third rail 102 constitute a third driving mechanism for moving the third hand arm 78.

Figure 13:
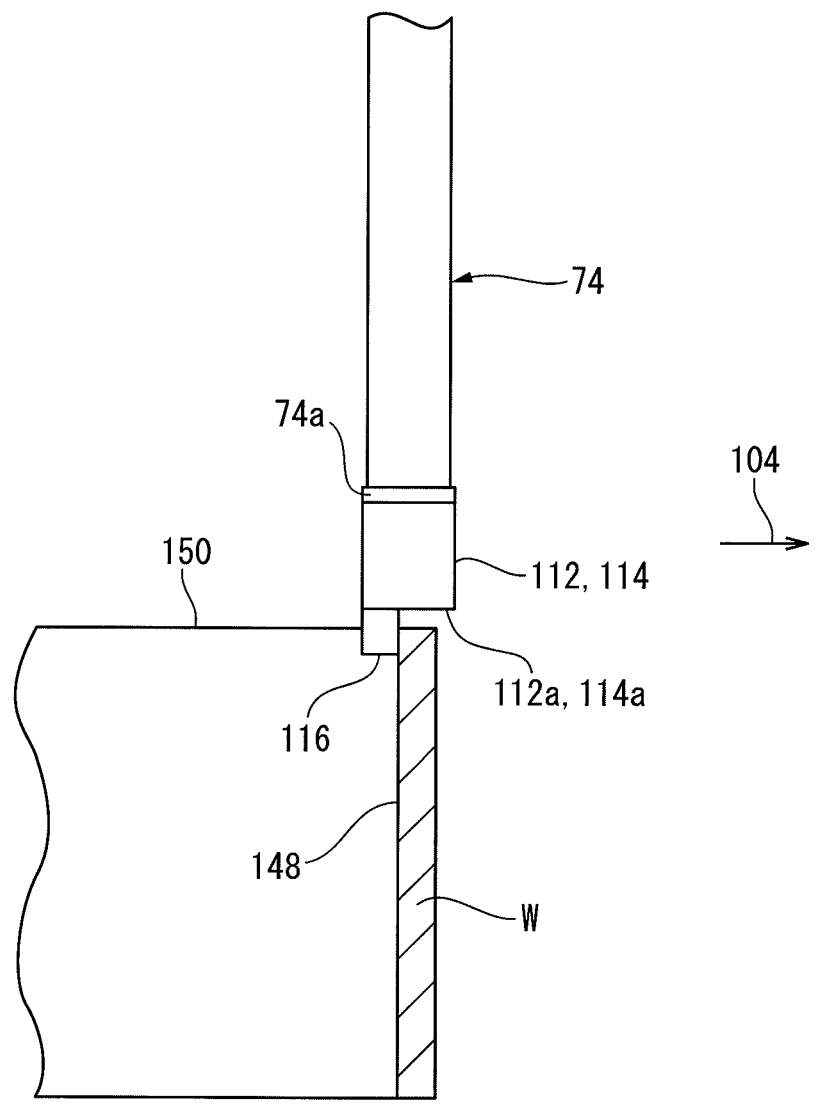
FIG. 13 is a diagram for explaining an operation of the robot at Step S12 in FIG. 10.

In this way, the first to third hand arms 74, 76, and 78 are moved to be separated from one another. As a result, the first to third butting parts 116, 124, and 132 are butted against the inner peripheral surface 148 of the workpiece W. The first hand arm 74 in this state is shown in FIG. 13. In FIG. 13, for easier understanding, only the workpiece W is illustrated by a cross section.

As shown in FIG. 13, in this state, the adsorption surfaces 112a and 114a are positioned just above the upper surface 150 of the workpiece W, since the adsorption surfaces 112a and 114a are disposed to be adjacent to the upper side of the first butting part 116, to be orthogonal to the first butting part 116, and to protrude in the first direction 104 (i.e., the direction in which the first butting part 116 butts against workpiece W) relative to the first butting part 116.

Similarly, when the second and third butting parts 124 and 132 is butted against the inner peripheral surface 148 of the workpiece W, the adsorption surfaces 120a, 122a, 128a, and 130a are respectively positioned just above the upper surface 150 of the workpiece W.

Thus, the first to third butting parts 116, 124, and 132 respectively function as positioning elements for appropriately positioning the adsorption parts 112 and 114, 120 and 122, and 128 and 130 with respect to the workpiece W.

Referring again to FIG. 10, at Step S13, the controller 144 causes the adsorption parts 112, 114, 120, 122, 128, and 130 to contact with the workpiece W. Specifically, the controller 144 operates the manipulator 146 so as to move the hand base 72 downward until the adsorption parts 112, 114, 120, 122, 128, and 130 come into contact with the upper surface 150 of the workpiece W.

At Step S14, the controller 144 adsorbs the workpiece W by the adsorption parts 112, 114, 120, 122, 128, and 130. At Step S15, the controller 144 operates the manipulator 146 so as to move the robot hand 70 to a desired place. Whereby, the workpiece W can be conveyed to a target place.

As described above, in the present embodiment, when adsorbing the workpiece W, the first to third butting parts 116, 124, and 132 are butted against the inner peripheral surface of the cylindrical workpiece W from radially inside, whereby the adsorption parts 112, 114, 120, 122, 128, and 130 are appropriately positioned with respect to the workpiece W based on the first to third butting parts 116, 124, and 132.

According to this configuration, it is possible to appropriately position the adsorption parts 112, 114, 120, 122, 128, and 130 with respect to the workpiece W having any inner diameter. Therefore, it is possible to apply the robot system 140 according to the present embodiment to an application for holding various types of workpieces W having different inner diameters.

Further, in the embodiment, each of the first to third butting parts 116, 124, and 132 is disposed between a pair of the adjacent adsorption parts. According to this configuration, it is possible to reliably position two adsorption parts provided adjacent to each of the butting parts 116, 124, and 132 just above the upper surface 150 of the workpiece W based on the butting parts 116, 124, and 132, when the butting parts 116, 124, and 132 are butted against the inner peripheral surface 148 of the workpiece W.

In the embodiment, a case has been described in which the adsorption surfaces 112a, 114a, 120a, 122a, 128a, and 130a respectively protrude in the first to third directions 104, 106, and 108 in regard to the first to third butting parts 116, 124, and 132.

Not limited to this disposition, however, the adsorption surfaces 112a, 114a, 120a, 122a, 128a, and 130a may be disposed to respectively protrude in directions opposite the first to third directions 104, 106, and 108 in regard to the first to third butting parts 116, 124, and 132.

According to a robot hand including such a configuration, it is possible to hold, for example, a columnar workpiece W. Specifically, the adsorption surfaces 112a, 114a, 120a, 122a, 128a, and 130a are disposed just above the upper surface of the workpiece W by butting the first to third butting parts 116, 124, and 132 against the outer peripheral surface of the workpiece W, as the embodiment shown in FIG. 1. Next, the columnar workpiece W can be lifted by adsorbing the upper surface of the workpiece W by the first and second adsorption parts.

In the embodiment illustrated in FIG. 1, a case has been described in which the first and second adsorption parts 28 and 38 are respectively fixed to the inner surfaces 26 and 36 of the first and second hand arms 14 and 16, and the first and second butting parts 32 and 42 are respectively formed in the inner surfaces 26 and 36 of the first and second hand arms 14 and 16.

Not limited to this disposition, however, the first and second adsorption parts may be respectively fixed to outer surfaces of the first and second hand arms 14 and 16 opposite the inner surfaces 26 and 36, and the first and second butting parts may be respectively formed in the outer surfaces of the first and second hand arms 14 and 16.

According to a robot hand including such a configuration, it is possible to, for example, a tubular workpiece W. Specifically, the first and second adsorption parts are disposed just above the upper end surface of the workpiece W by butting the first and second butting parts against the inner peripheral surface of the workpiece W, as the embodiment illustrated in FIG. 7. Next, the cylindrical workpiece W can be lifted by adsorbing the upper end surface of the workpiece W by the first and second adsorption parts.

Hereinabove, the invention has been described by the embodiments. However, the embodiments are in no way limitative of the invention specified within the appended Claims. Combined forms of the features described in the embodiments of the invention are within a technical scope of the invention. However, all the combinations of the features are not necessarily important to solution of the invention. As obvious to those skilled in the art, various changes or improvements can be made of the embodiments.

It is to be noted that an execution order of operations, procedures, steps, processes, or stages in the device, the system, the program, or the method described on Claims, the specification, and the drawings is not clearly defined as "before" or "prior to", and these can be realized in an arbitrary order unless an output of previous processing is used for subsequent processing. Even when the operation flow in Claims, the specification, and the drawings is described by using "first", "next", or the like for convenience, it does not mean that the operation is to be carried out in this order.

The invention claimed is:

1. A robot hand for holding an object, comprising:
a hand base;
a first hand arm attached to the hand base, the first arm including a first butting part having a first butting surface extending in a first direction and a first adsorption part having a first adsorption surface extending in a second direction perpendicular to the first direction, the first adsorption surface disposed adjacently to the first butting surface, wherein the first butting surface and the first adsorption surface come into contact with the object and the first adsorption surface is able to adsorb the object, the first adsorption part including the first absorption surface facing in the first direction;
a second hand arm attached to the hand base, the second hand arm including a second butting part having a second butting surface extending in the first direction and a second adsorption part having a second adsorption surface extending in the second direction perpendicular to the first direction, the second adsorption surface disposed adjacently to the second butting surface, wherein the second butting surface and the second adsorption surface come into contact with the object and the second adsorption surface is able to adsorb the object; and
a driving mechanism for moving the first hand arm and the second hand arm relative to each other so as to approach each other or separate from each other.

2. The robot hand according to claim 1, wherein the driving mechanism includes a first driving mechanism for moving the first hand arm and a second driving mechanism for moving the second hand arm.

3. The robot hand according to claim 1, wherein
the first hand arm includes a third adsorption part disposed adjacently to the first adsorption part,
the first butting part is disposed between the first adsorption part and the third adsorption part,
the second hand arm includes a fourth adsorption part disposed adjacently to the second adsorption part, and
the second butting part is disposed between the second adsorption part and the fourth adsorption part.

4. A robot comprising:
the robot hand according to claim 1; and
a manipulator to which the hand base is attached.

5. A robot system comprising:
the robot according to claim 4; and
a controller for controlling the robot, wherein
the controller is configured to:
control the manipulator to move the hand base to a predetermined position;
control the driving mechanism to move the first hand arm and the second hand arm relative to each other so that the first butting part and the second butting part butt against the object;
control the manipulator to move the hand base so as to contact the first adsorption part and the second adsorption part with the object; and
adsorb the object by the first adsorption part and the second adsorption part.

6. A method of holding an object with the robot according to claim 4, comprising:
moving the hand base to a predetermined position;
moving the first hand arm and the second hand arm relative to each other so that the first butting part and the second butting part butt against the object;
moving the hand base to contact the first adsorption part and the second adsorption part with the object; and
adsorbing the object by the first adsorption part and the second adsorption part.

* * * * *